United States Patent [19]

Kozuki

[11] 4,149,870

[45] Apr. 17, 1979

[54] PROCESS FOR MANUFACTURING DEODORIZED FERTILIZER

[76] Inventor: Junji Kozuki, 2-10, 1-chome, Shinsenjidori, Fukiai-ku, Kobe-shi, Hyogo-ken, Japan

[21] Appl. No.: 753,490

[22] Filed: Dec. 22, 1976

[30] Foreign Application Priority Data

Dec. 22, 1975 [JP] Japan .................................. 50-153022
Jul. 30, 1976 [JP] Japan .................................. 51-91070

[51] Int. Cl.² .............................................. C05F 3/00
[52] U.S. Cl. ......................................... 71/21; 71/63; 210/59
[58] Field of Search .............. 71/11, 12, 21, 63, 6 HC, 71/43, 61, 62; 210/18, 51–53, 59

[56] References Cited

U.S. PATENT DOCUMENTS

| 113,416 | 4/1871 | Forbes et al. | 71/12 |
| 1,810,802 | 6/1931 | Travers et al. | 71/11 |

Primary Examiner—Ferris H. Lander

[57] ABSTRACT

The present invention relates to a manufacturing method of deodorized and neutralized fertilizers. The first suspension containing a large amount of basic components is prepared by adding water to the powdered basic rocks and agitating the same, while the second suspension containing a large amount of free acids of malodorants is prepared by adding water to the organic filth materials and agitating the same. The two suspensions thus prepared are then mixed together to produce a gel material due to the neutralization reactions between the basic and the acid components in the suspensions, whereby the organic filth materials are deodorized resulting in a fertilizer of enhanced fertilizability.

2 Claims, 5 Drawing Figures

PROCESS FOR MANUFACTURING DEODORIZED FERTILIZER

BACKGROUND OF THE INVENTION

The excrementitious matter has long been used as efficatious fertilizer since old times; but it is now being disfavored because of its offensive odor and inconvenience in handling due to the fluidity of the matter. Various attempts have now been made to deodorize and solidify the filth materials for easy handling. One example of such filth-treatment apparatus is such as is given in the followings.

The material to be treated is first separated into solid components and liquid components, namely, feces and urine in a storage tank; the feces are pulverized in a pulverizing tank, and subsequently transfered to an electrolysis tank where it is mixed with the urine and electrolyzed after adding sodium sulfate and ferric oxide in order to deodorize the material. The resultant products are then added with pottasium silicate to enhance the viscosity, and finally dried to cakes by a drying means.

Thus, such systems wherein the filth material is deodorized by electrolysis requires dilute suspensions containing considerably larger amount of liquid components because a sufficient amount of electric current must be applied in order to deodorize the material. Consequently, it becomes necessary to mix a large amount of unfertilizable diatomite into the suspension at the drying stage in order to recover the viscosity once lost by dilution. Moreover, since the excrementitious matter contains a number of organic nonelectrolytes, the electrolytic method can furnish only insufficient deodorization. It is especially inappropriate when applied to treatments in an industrial scale, because it requires a great amount of electricity only to achieve some insufficient degree of deodorization. Furthermore, the fertilizability of the products is impaired by addition of large amount of diatomite which is completely innutritious to plants.

One of the object of the present inventin is to provide a new filth-treatment apparatus wherein the filth material is converted, as well as deodorized, to a fertilizer having greater fertilizability than the naturally aged manure due to the powdered basic rocks, having a selected composition and particle size, mixed into the filth material. On the other hand, there is another category of filth-treatment technology in which the reutilization of the product is not intended. One of such method is the well known activated sludge process, wherein the malodorants in the filth are biologically decomposed by the activity of living organisms such as bacteria.

The method according to the present invention is based upon a chemical method, as opposed to the above biological activated sludge process, wherein the acid malodorants are chemically neutralized by basic agents.

SUMMARY OF THE INVENTION

The object of the present invention is to provide a method and an apparatus for converting the organic excrementitious materials having offensive odors into a deodorized and neutralized fertilizer of enhanced fertilizability. In order to accomplish the foregoing objects, the method according to the present invention comprises:

(1) a process wherein a quantity of powdered rock is suspended in water and agitated to promote the hydrolysis of water-soluble metalic salts contained in the rocks in order to produce a suspension in which a large amount of basic components are dissolved; (2) a process wherein the organic filth materials of a volume three to ten times that of said powdered rock is suspended in water and agitated to promote the hydrolysis of acid malodorants in order to produce a suspension in which a large amount of free acids is dissolved; (3) a process wherein said two suspensions are mixed together to allow the neutralization reactions to take place between said basic components and free acids of amalodorants to produce gel compounds; and (4) a process wherein the gel compounds are dried.

In the most preffered embodiment, of the present invention, the first suspension is prepared by suspending a volume of powdered basic rock preliminary ground to below 200-mesh into 20 to 100 volume percent of water, and agitating to pulverize the suspensoid down to a particle size below 0.04 microns, and the second suspension is prepared by diluting the filth materials about four times as much volume as said powdered basic rock by 20 to 100 volume percent of water, and agitating to pulverize the suspensoid down to a particle size below 0.04 microns.

The apparatus to carry out the manufacturing method according to the present invention comprises:

(1) a powdered rock storage tank provided with a rotary blade to further pulverize the rock, (2) an organic filth material storage tank provided with a rotary blade to pulverize the content, (3) a water storage tank to supply said two tanks, (4) a mixing and storage tank to mix the two suspensions and store the resultant gel substance, said mixing and storage tank being provided with a rotary vane to agitate the geled contents, (5) a drying chamber for drying gel substance, said drying chamber being provided with freely-rotatable drums having a heater means on its peripheral surface, and (6) an discharge chamber located under the drying chamber and communicated with the same, said discharge chamber being provided with a screw conveyer to collect and discharge the deodorized fertilizer out of the apparatus.

DESCRIPTION OF THE INVENTION

The malodorants which give offensive odors to organic filth materials such as muck or manure consist primarily of ammonia $NH_3$, indole $C_8H_7N$, skatol $C_9H_9N$, trimethylamine $C_3H_9N$, butyric acid $CH_3CH_2CH_2COOH$, ethyl mercaptan $C_2H_6S$, or hydrogen sulfide $H_2S$ etc. The most of these components such as hydrogen sulfide $H_2S$, butyric acid $CH_3CH_2CH_2COOH$, indole $C_8H_7N$, or skatol $C_9H_9N$ are acid substances, with only a few exceptions such as ammonia $HN_3$ or trimethylamine $C_3H_9N$ which are basic. Hence, it can be understood that these acid malodorants can be neutralized and decomposed by adding basic agents to them.

On the other hand, the neutralized and deodorized products thus obtained is extremely useful as a fertilizer. It is to be noticed, at this point, that the basic neutralizer should be further restricted by the condition that it must be safe to the plants when assimillated by them, if the product is to be used as fertilizer, and it is further desirable that the basic material enhances the fertilizability of the products. Now, we pay attention from this standpoint to basic rocks and ultra basic rocks as well. The average composition (wt %) of the primary constituents of basic rocks and the ultra basic rocks such as diabase, diorite, gabbro, peridotite, basalt, or shalstein etc. is $SiO_2$(45 to 50), $Al_2O_3$(20 to 24), FeO (6 to 8), CaO(7 to 10), $K_2O$(2 to 3), MgO(2 to 3), $Na_2O$(1.5 to 2.0), $TiO_2$(1.5 to 2.0), $P_2O_3$(1 to 2), MnO(0.3 to 0.5) and $Cl_2O$(0.2 to 0.4). It should be noticed that these basic rocks contain less $SiO_2$ compared to such rocks as granite or rhyolite; the excess $SiO_2$ in these other rocks is replaced by metalic salts in case of the basic rocks. These metalic elements existing as oxides, carbonates, sulfides or silicates in these rocks generate a group of cations when they are eluted and dissociated in water as the powdered basic rock, having particle size say 0.04 micron, is suspended. Therefore, the basic rocks may be used as the basic agent to neutralize the acid malodorants of organic filth. The large amount of metalic cations contained in the suspension also acts as supplier of the assimilable metalic elements indispensable for plants. Thus, the basis of the present invention exists in decomposition of the acid malodorants in the organic filth by neutralizing them by the basic cations of metalic salts eluted from the basic rocks.

In order to promote the elution of metalic salts, the rocks must be pulverized to as small particle size as possible. The particle size less than 0.04 micron is preferable in view of the fertilizability of the product, since particles smaller than the fibril diameter, i.e. about 0.05 microns, are easily assimilated by plants. In order to rapidly pulverize the rocks to particle size smaller than 0.04 microns, powders finer than 200-mesh are preferable and, if available, powders finer than 300-mesh are desirable. The coarse particles greater than 200-mesh are insufficient for this purpose. The amount of water added to the powdered rock should preferably be 20 to 100 volume percent of the powdered rock, since too much water would overload the drying means when the final product is subjected to drying. A tank preferable for effectively carrying out pulverization and suspension of the powdered rock will be described below.

Figure 2:
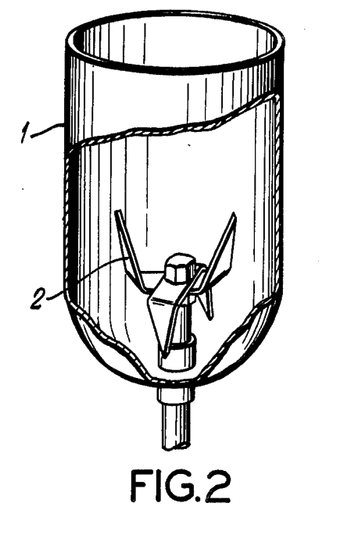
FIG. 2 is a view partially in section, showing the powdered rock tank according to the present invention.

Referring now more particularly to the drawing, the powdered basic rock storage tank 1 comprises a cylinder having a hemispherical bottom portion, wherein the bottom portion of the tank is provided with a rotary blade 2 for pulverizing the rocks, while the upper portion of the tank is provided with a hopper-type supply port upon which a lid is disposed to prevent the content from scattering. The rotary blade consists of two U-shaped single-blades mounted at right angle and in opposite directions to each other, wherein the cutting edge of the blade is provided at the leading edge of the blade. The rotary blade 2 is located near the center portion of the bottom, and the shaft of the rotary blade is connected to a drive motor 4 located below the powdered basic rock storage tank 1. The powdered basic rocks, thus pulverized to a very fine particle size, offer a group of metalic cations such as $Al^{3+}$, $Ca^{2+}$, $Mg^{2+}$, $K^+$ or $Na^+$, when the powder is suspended and the water-soluble salts of the corresponding metals eluted into water.

The solid portion of the organic filth material should also be pulverized to promote the neutralization reaction. The particle size of the filth material should preferably be 0.04 microns, also in this case, in order to enhance the fertilizability. The amount of water added to the filth should be 20 to 100 volume percent of the filth material to avoid overloading of the dryer means. A tank preferable for effectively carrying out pulverization and suspension of the filth materials will be described below.

Figure 3:
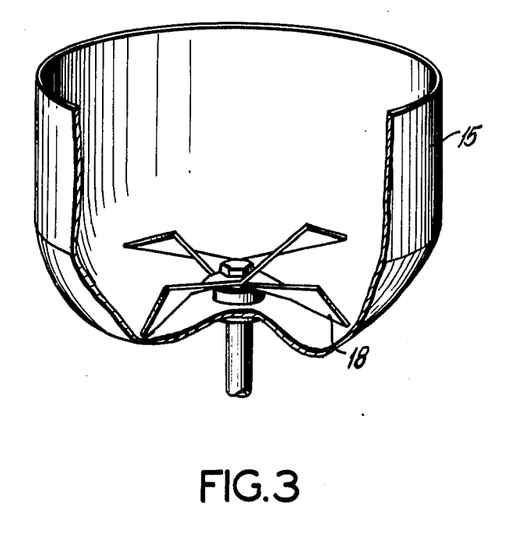
FIG. 3 is a view partially in section, showing the filth materials storage tank according to the present invention.

The filth storage tank 8, like powdered rock storage tank 1, comprises a cylinder having a hemispherical bottom portion, wherein the bottom portion of the tank is provided with a rotary blade 12 for pulverizing the solid portion of the filth, while the upper portin of the tank is provided with a hopper-type supply port upon which a lid 11 is disposed to prevent the content from scattering. The rotary blade 12, like rotary blade 2, consists of two U-shaped single-blades mounted at right angle and in opposite directions to each other, wherein the cutting edge of the blade is provided at the leading edge of the blade. The rotary blade 12 is located near the center portion of the bottom, and the shaft of the blade is connected to a drive motor 13 located below the filth storage tank 8. The pulverized filth suspension thus prepared offers a group of malodorant anions in a form of free acids when the malodorants in the filth elute into water.

After allowing the both suspensions to stand for a while, and permitting the basic and the acid components to completely elute into water, the two suspensions are mixed together so that the basic and the acid components neutralize each other, the malodorants decomposes, and the offensive odors in the filth disappear, and the neutralized sedimentation thus produced is gradually transformed into gel material. The neutralization reactions included in the above processes are schematically represented by:

For example, carbon dioxide is decomposed by calcium salt of the rock components as follows:

$CaO + H_2O \rightarrow Ca(OH)_2$

$Ca(OH)_2 + CO_2 \rightarrow CaCO_3 + H_2O$

$Ca(OH)_2 + 2H_2CO_3 \rightarrow Ca(HCO_3)_2 + 2H_2O$

Another example are as follows:

Basic components of the organic filth materials, ammonia $NH_3$, trimethylamine $(CH_3)_3N$, methylamine $CH_3NH_2$, are decomposed by dichlorine monoxide as follows:

The tank for mixing the two suspensions of basic rock and filth is preferably provided with a supply port at the upper portion of the tank, a discharge port at the lower portion of the side wall for discharging the mixture, and rotary vanes at the bottom of the tank, the rotating shaft whereof connected to a drive motor by penetrating the bottom wall of the tank.

Since the neutralized mixture of the filth and the basic rock is inconvenient to handle due to the fluidity, it is subsequently subjected to drying process in which the gel is dried and solidified. The dryer apparatus according to the present invention is preferably provided with rotary drums, the peripheral surface whereof is heated so that the geled mixture is contacted to the surface to evaporate water or other volatile components in the mixture. The mixture then gradually dries while the drums rotate, and the resultant solids are scraped and collected midway in the rotation of the drums. The loading, drying, and scraping of the product are carried out successively while the drums undergo one revolution, so that the drying process can be repeated continuously.

The deodorized solid product thus obtained acts as an excellent fertilizer because it is abundant of elements such as N, P, K, Mn, Fe, and Mg having been derived from the basic rocks. Such a natural fertilizer enhances the fertility of sails to promote the growth of plants, since it contains a sufficient amount of organic substances which synthesized fertilizers are defficient of. The fertilizer produced according to the present invention has an improved nutrient composition due to basic components derived from the rocks, and is adapted to promote the growth of plants because the small particle size helps the assimillation by plants. It is also an advantage of the fertilizer according to the invention that it contains no harmful substance, because the basic components to neutralize the acid malodorants are all derived from natural rocks.

Figure 4:
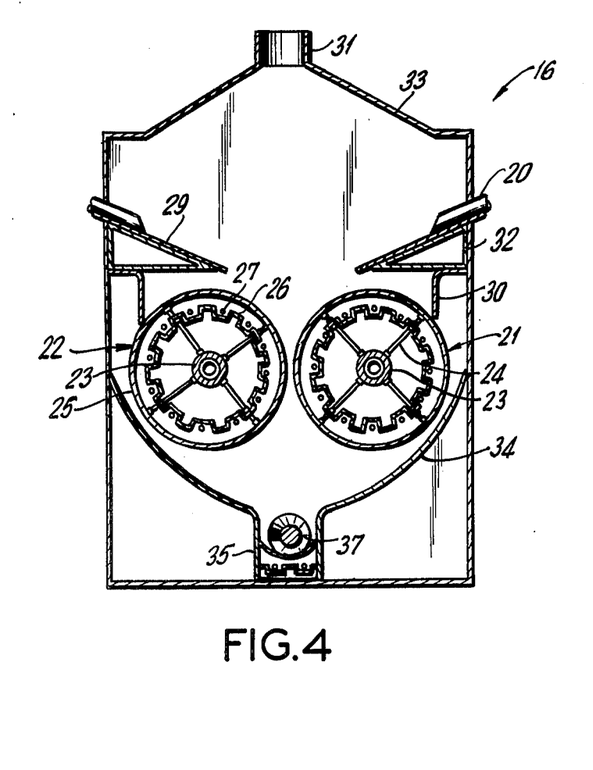
FIG. 4 is a view vertically in section, showing the drying chamber.

The construction of the apparatus for carrying out the continuous process of suspending, mixing, and drying of the materials will be described in detail below. The tank 1 for storing the powdered basic rocks comprises a cylinder having a hemispherical bottom portion, wherein the bottom portion of the tank is provided with a rotary blade 2 for pulverizing the rocks to particle size below 0.04 microns, while the upper portion of the tank is provided with a hopper-type supply port upon which a lid is disposed to prevent the content from scattering. The rotary blade 2 consists of two U-shaped single blades mounted at right angle and in opposite directions to each other wherein the cutting edge of the blade is provided at the leading edge of the blade. The rotary blade 2 is located near the center portion of the bottom, and the shaft of the rotary blade is connected to a drive motor 4 located below the powdered basic rock storage tank 1. To the basic rock storage tank 1 of an appropriate volume is connected a box-type water storage tank 5 to supply the same, said water storage tank having a hopper-type supply port above which a bottom orifice of the water pipe 6 opens to supply the tank 5 by pumps or other means connected to the water pipe. The water storage tank 5 is provided with a pipe to supply said basic rock storage tank 1, said water pipe opening above the supply port of the tank 1. The volume of the water storage tank 5 is determined in accordance with the amount of filth material to be treated, and a volume a little larger than that of tank 1, would be preferable since the water storage tank 5 supplies both the filth storage tank and the basic rock storage tank 1. An organic filth storage tank 8 is located off to the lower left of the tank 5. The filth storage tank 8, like the basic rock storage tank 1, comprises a cylinder having a hemispherical bottom portion, and is provided with a hopper-type supply port at the upper portion whereof, said supply port of the tank 8 being located near the bottom portions of both the basic rock and the water storage tanks 1 and 5, and supply pipes, each provided to the bottom portion of the tanks 1 and 5 respectively, opening towards said supply port having a lid 11 upon it. The bottom portion of the tank is provided with a rotary blade 12 in order to pulverize the filth material preferably down to particle size smaller than 0.04 microns. The blade 12, similarly to blade 2, consists of two U-shaped single-blades mounted at right angles an in opposite directions to each other, the cutting edge whereof being provided at the leading edge of the blade. The rotary blade 12 is located near the center portion of the bottom, the rotating shaft whereof being connected to a drive motor 13 located below the tank 8. The shaft may be connected through transmission shafts and a clutch to the motor 4 located below tank 1. instead of motor 13. The filth material storage tank is 5 to 10 times greater than both the basic rock storage tank 1 and the water storage tank 5, since the tank 8 holds both rock suspension and water supplied from tanks 1 and 5 respectively in addition to the filth material. The mixing tank 8 is connected through the supply pipe 14 to the neutralization tank 15 which is disposed on the support means 17 so that the level of the neutralization tank 15 is higher than that of drying chamber 16 in order to facilitate falling of the mixture into the chamber 16 connected to the neutralization tank 15; hence the supply pipe 14 extends upward from the bottom portion of the filth storage tank 8, and opens above the upper supply port of the tank 15. A conventional vacuum pump 43 is, accordingly, preferably mounted on the support means 17, so that the mixture is carried through the pump against the gravitation up to the neutralizatin tank 15. The neutralization tanks 15 comprises a cylinder having a hemispherical bottom portion, in much the same way as tanks 1 and 8, the upper portion whereof being provided with a hopper-type supply port while the bottom portion being provided with a rotary vane 18 to agitate the content. The rotary vane 18 is located near the center portion of the bottom, the shaft whereof being connected to a motor 19 located below the bottom portion of the tank 15. The volume of the neutralization tank 15 is about 1.5 times that of the filth storage tank 8 to permit slow agitation of the mixture to promote the neutralization reactions. The lower wall portion of the neutralization tank is provided with a pipe 20 for discharging the content, said pipe 20 penetrating through the upper wall portion of the drying chamber 16, and opening inside the chamber 16. Inside the drying chamber 16 is laterally disposed a pair of drums 21 and 22 in spaced relation to each other, the rotating shaft 23 whereof being connected to the drive motor 42. A support rod 24 extending in a radial direction from the shaft 23 doubly supports the outer and the inner peripheral walls 25 and 26, between which are inserted Nichrome coils 27 extending all over the peripheral surface to heat the outer peripheral wall 25. As shown in FIG. 4, the inner peripheral wall is provided with a number of rectangular grooves to permit the insertion of the coil 27. Between the outer and inner peripheral walls 25 and 26 is provided a spacing to permit the uniform heating of the wall 25. The width of the spacing should not be too large, but within a range of 0.15 to 0.2m in order to aboid the lowering of efficiency of heat radiation. The terminal of the coil 27 should be such that it allows the electrical contact between the terminal and the terminal to the power supply during the rotation of the drum. The outer peripheral wall 25 of drums 21 and 22 should be made of a high thermal conductivity material, in order to supply sufficient heat for drying the geled material adhering to them. The two drums are laterally spaced with a spacing 3 to 4 mm width in order to facilitate the adhesiion of the geled mixture onto the outer surface 25 of drums 21 and 22 by pressing it from both sides during the rotation of the drums. A dispersion conduit 29 extends above the drums 21 and 22, being supplied from the delivery pipe 20, and inclined towards the spacing between the drums 21 and 22. The dispersion conduit 29 diverges from the opening end portion of the said pipe 20 towards the either sides of the drum so that the width of the dispersion conduit at the lowest termination corsponds to the total lateral length of the outer peripheral wall of the drum so that the geled mixture is uniformly supplied onto the outer walls 25 of the drum. The dispersion conduit is further provided with partition walls to effect better dispersion of the mixture. Two such conduits disposed face to face above both of the drums are preferable, although only one such dispersion conduit disposed above either of the drums would work.

Figure 1:
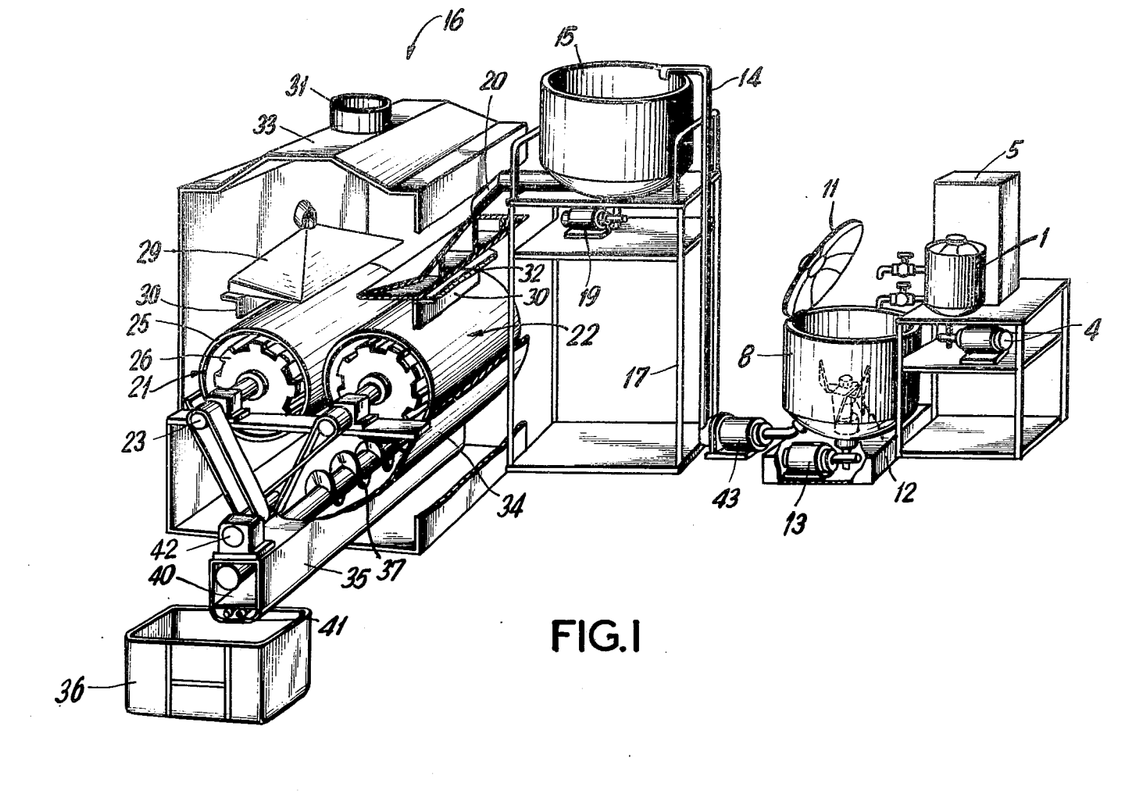
FIG. 1 is a perspective view of the whole system to carry out the method according to the present invention.

At the outer sides of drums 21 and 22, are the scraper plates provided along all length of the outer peripheral wall 25 to scrape off the solidified mixture. The scraper plates 30 are disposed in a direction so that the lower end of the plates is directed face to face towards the drum surface, and the upper root portion of the plates is mounted on the supporting beam 32 of the said dispersion conduit 29. The roof 33 above the dispersion conduit 29 is provided with a vapor exhaust port 31 through which the vapor produced on the surface of drums 21 and 22 during drying are exhausted. The bottom wall 34 below the drums 21 and 22 is tilted and decends towards the dicharge chamber 35 to collect the dried product to the chamber 35. The discharge chamber 35 is integrally formed on the bottom wall, and the upper portion of the chamber opens toward the drying chamber, while the cylindrical front end portion of the chamber extrudes in the forward direction from the drying chamber 16, and opens above the storage chamber 36 located adjacent to the discharge chamber 35. The discharge chamber is equipped with a screw conveyer 37 disposed parallel to the drums 21 and 22, and extending along all length of the chamber 36. The root portion of the screw conveyer shaft is connected to a motor 38. The shaft may either be received by bearings at both ends or, alternatively, only at the end remote from the root portion by the cylindrical front portion of the discharge chamber 35. The screwed fins of the conveyer slide over the bottom portion of the discharge chamber 35 as the rod 37 rotates, thus the solidified mixture scraped from the drums 21 and 22 is collected and carried to the discharge port 40 located at the front end of the discharge chamber. The back side of the bottom plate of the discharge chamber 35 is provided with a Nichrome coil 41 for heating the same.

The manufacturing process of the neutralized fertilizer by use of the apparatus according to the present invention will be described below.

The basic rocks such as diabase, diorite, gabbro, peridotite, basalt or shalstein ground to about 200-mesh or preferably to 300-mesh are first thrown into the basic rock storage tank 7, the tank is then supplied with water from the water storage tank 5 which has been filled from the water pipe, and subsequently the rotary blades 2 start rotation to further pulverize the basic rocks. The filth storage tank 8 is, then, supplied with a volume of filth material three to ten times as much as the basic rocks and the blade 12 starts rotation, after 20 to 100 volume % of water has been added, to pulverize the filth down to about 0.04 microns particle size.

Both suspensions of basic rock and the filth material are then allowed to stand for a while to allow full hydrolysis of the basic components of the powdered basic rocks and the acid components of the filth. They are subsequently mixed together, by adding the rock suspension into the filth storage tank 8. The basic and the acid components then neutralize each other, to decompose the malodorants, and the mixture gradually gels. The geled substance is then transfered through the supply pipe 14 to the neutralization tank 15 to further promote the decomposition reactions. The mixture is further neutralized and geled in the tank 15 by rotating the vane 18. The product is then transfered through pipe 20 onto the dispersion condiut 29. A drying machine such as vacuum filter, centrifugal dryer, or compression dryer may be provided midway on the pipe 20 to remove the excess water if the gel is too wet at this stage.

The gel carried to the dispersion conduit 29 is then fed to the spacing between drums 21 and 22, where the mixture adheres by compression to the outer peripheral surface 25 since the drums rotate in a direction opposite to each other so that both the outer peripheral surfaces 25 move downwards at the inside portion of the spacing. The geled mixture is then gradually dried on the surface during the rotation of the wall, since the outer peripheral wall 25 is heated by the heater coil 27 located on the inner peripheral surface 26 of the drums. When the mixture reaches the scraping plate 30 disposed at a position opposite to the spacing, it is scraped from the surface by running against the plate. The resultant solid product after collected by the scraping plate 30 is guided to the discharge chamber 35 by the bottom wall 34, where the product is further dried by the heater coil 41 disposed at the bottom of the chamber 35 and carried by means of the screw conveyer 37 to the discharge port 40, the product being discharged wherefrom into the storage chamber.

The electric heater means in the above embodiment may be replaced by a oil burner or a steam heater. On the other hand, the heating means to be disposed at the bottom portion of the discharge chamber may be omitted if a perfect drying can be obtained by the drum heaters.

The embodiment above described is an example most adapted for carrying out the continuous precessing of materials from pulverization to the drying of the product. Now a description will be made of a modified embodiment wherein the drying process and a part of the mixing process of the foregoing embodiment are somewhat simplified.

Figure 5:
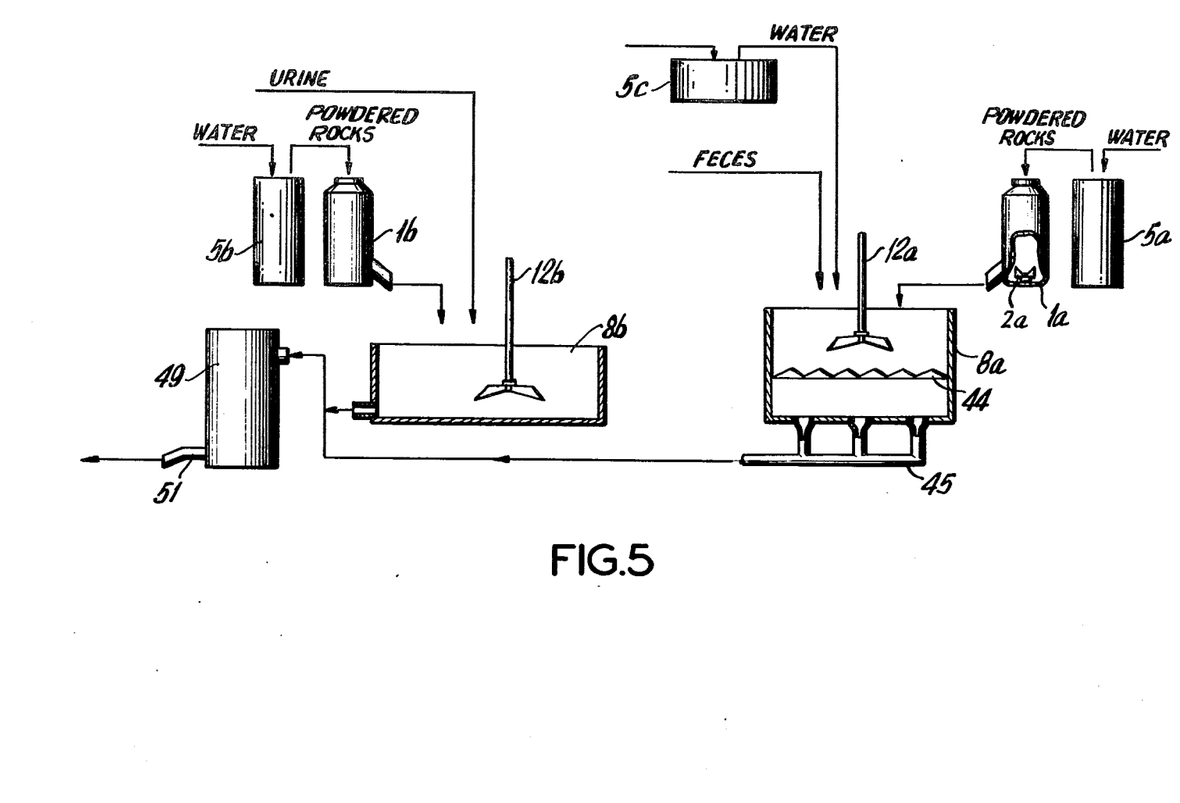
FIG. 5 is the schematic perspective view of the whole system according to other embodiment of the present invention.

The filth storage tank 8 is subdivided into a feces storage tank 8a and a urine storage tank 8b to which the storage tanks. 1a and 1b and the water storage tanks 5a, and 5b and 5c belong. The upper surface of the feces storage tank 8a is provided with supports which receive between them a fan 12a extending into the tank 8a whereby the feces and the powdered rock are agitated and mixed, while the bottom of the feces storage tank 8a is provided with a filter bed 44 longitudinally disposed along the flow direction and consisting of corrugated plates provided with a number of openings of 2 mm diameter. The liquid portion of the material having filtered through the filter bed 44 are carried to the exhaust tank 49 through the exhaust ducts 45 disposed below the filter bed 44. It is preferable to dispose one such exhaust ducts 45 for every one square meters of area.

The feces storage tank 8a is supplied by a water storage tank 5c and the first basic rock storage tank 1a which in turn is supplied by the water storage tank 5a. The powdered basic rock and the water, supplied from the water supply port, are agitated and mixed in the first basic rock storage tank 1a by a rotary blade mounted on the support, and subsequently transfered through an exhaust duct to said feces storage tank 8a.

The urine treatment portion of the present embodiment comprises urine storage tank 8b, the second basic rock storage tank 1b and a water storage tank 5b to supply the second basic rock storage tank 15. The upper surface of the urine storage tank 8b is provided with a supports which receive between them a fan 12b extending into the tank 8b whereby the urine and the powdered basic rock are agitated and mixed.

The urine storage tank 8b is provided with an exhaust duct 45 connected to the exhaust tank 49, and the second basic rock storage tank 16 connected to the water storage tank 5b. The basic rock and the water supplied from the water supply port are agitated and mixed in the second basic rock storage tank 1b by rotating the blade mounted on a support and subsequently transfered through an exhaust duct to said urine storage tank 8b. The exhaust ducts 45, extending from the said feces storage tank 8b and the urine storage tank 8b respectively, are both connected to an exhaust tank 49, where the mixture supplied through these exhaust ducts 45 is temporarily stored. The exhaust tank 49 is provided with a water discharge duct 51 connected to the external systems, and the bottom portion of the tank is provided with a number of small openings through which the exhaust water is drained. Each water storage tank 5a, 5b and 5c are supplied from a suitable external water system. Each of the rotary blades and the fans, 12a and 12b are driven by the drive shaft located at the upper portion of the system. The drying chamber may be omitted in this simplified version, and the sun drying would be sufficient when used for purposes where rapid drying is not required, because the organic filth sedimented on the filter bed contains only less amount of water since the powdered basic rock is mixed after the feces are separated from the urine.

Some examples of fertilizers manufactured by the apparatus according to the present invention will now be described in the followings.

EXAMPLE 1

A $0.2m^3$ diabase material ground to about 300-mesh and about the same volume of water from water storage tank 5 are supplied to the $0.5m^3$ basic rock storage tank and the powdered rock is pulverized to below 0.04 micron particle size by rotating the blades 2 of 0.36m length at a rate faster than 5000 rpm for two minutes. The composition of the diabase is listed in Table I.

TABLE 1

| Composition of diabase (wt%) | | | | | | |
|---|---|---|---|---|---|---|
| $SiO_2$ | $Al_2O_3$ | $Fe_2O_3$ | FeO | MgO | CaO | $Na_2O$ |
| 48.5 | 20.0 | 3.0 | 6.0 | 3.5 | 7.5 | 3.5 |
| $K_2O$ | $H_2O$ | $TiO_2$ | $P_2O_3$ | MnO | $Ca_5ClPO_4$ | |
| 2.5 | 3.0 | 2.0 | 1.2 | 1.5 | 0.3 | |

A $1.0m^3$ of cow dung is, then, thrown into the $1.5m^3$ filth storage tank and pulverized, after supplying about $0.3m^3$ of water from the water storage tank 5, to below 0.04 micron particle size by rotating the blade 12 of 0.7m length at a rate faster than 3500 rpm for two minutes. The powdered basic rock suspension previously prepared is then added to the filth suspension after allowing both suspensions to stand for two minutes, and the mixture is then agitated for three minutes. The mixture is transfered to the $2.0m^3$ neutralization tank 15 where it is quietly stirred for five minutes by a rotary vane of 0.3m length at a rate 20 to 30 rpm. The geled mixture is, subsequently, sent to the drying chamber 16 to be dryed at 200 to 300° C. by drums 21 and 22 of outer and inner peripheral radii 0.75 and 0.6 m respectively and spaced 4 mm apart to each other. Each drum, rotating at 2 rpm, is provided with twelve grooves for inserting the heating coils 27. The solidified material is, then, scraped from the drum surfaces and collected to the discharge chamber 35, where the mixture is dried at 170 to 200° C. and discharged by the screw conveyer of 0.1 m radius and 2 m length. The mixture is heated and dried for about thirty minutes as it passes through the steps from the drying chamber to the discharge chamber. The solid product discharged from the discharge chamber 35 is delivered to the external system after temporarily stored in a cylindrical storage chamber 36 the capacity whereof being about $4m^3$. The deodorization efficiency of this procedure is listed in the first column of the Table II.

EXAMPLE 2

A solution of 1.0 $m^3$ pig dung dissolved into 0.2 $m^3$ water is agitated for two minutes to pulverize the solid components and allowed to stand during next two minutes, while the powdered basic rock suspension prepared by adding 0.2 $m^3$ diabase ground to 300-mesh into $0.2m^3$ water is further pulverized by agitating for two minutes and allowed to stand during next two minutes.

The powdered rock suspension is then added to the filth storage tank and mixed with the excrementitious solution by agitating for three minutes. The mixture is then transfered to the neutralization tank where it is allowed to stand for five minutes, and subsequently dried for about thirty minutes during passage from the drying chamber to the discharge chamber. The results of malodorant analysis are listed in the second column of Table II.

EXAMPLE 3

A solution of 1.0 m³ fowl droppings dissolved into 0.2 m³ water is agitated for two minutes to pulverize the solid components and allowed to stand during next two minutes, while the powdered basic rock suspension prepared by adding 0.2 m³ diabase ground to 300-mesh into 0.2 m³ water is further pulverized by agitating for two minutes and allowed to stand during next two minutes.

The powdered rock suspension is then added to the filth storage tank and mixed with the excrementitious solution by agitating for three minutes. The mixture is then transfered to the neutralization tank where it is allowed to stand for five minutes, and subsequently dried for about thirty minutes during passage from the drying chamber to the discharge chamber. The results of malodorant analysis are listed in the third column of Table II.

EXAMPLE 4

A solution of 1.0 m³ activated filth dissolved into 0.2 m³ water is agitated for two minutes to pulverize the solid components and allowed to stand during next two minutes, while the powdered basic rock suspension prepared by adding 0.2 m³ diabase ground to 300-mesh into 0.2 m³ water is further pulverized by agitating for two minutes and allowed to stand during next two minutes.

The powdered rock suspension is then added to the filth storage tank and mixed with the filth solution by agitating for three minutes. The mixture is then transfered to the neutralization tank where it is allowed to stand for five minutes, and subsequently dried for about thiry minutes during passage from the drying chamber to the discharge chamber. The results of malodorant analysis are listed in the fourth column of Table II.

Table 2

| DEODORIZATION Conditions | Example 1 cow dung | Example 1 mixture with powdered rock | Example 2 pig dung | Example 2 mixture with powdered rock | Example 3 fowl droppings | Example 3 mixture with powdered rock | Example 4 activated filth | Example 4 mixture with powdered rock |
|---|---|---|---|---|---|---|---|---|
| Malodorants | BEFORE Mixing | ten minutes after mixing | before mixing | ten minutes after mixing | before mixing | ten minutes after mixing | before mixing | ten minutes after mixing |
| Ammonia | 13.6 ppm | 0.3 ppm | 14.8 ppm | 0.3 ppm | 376 ppm | 0.4 ppm | 2.4 ppm | ND |
| Trimethylamine | 12.8 ppb | 0.2 ppb | 10.7 ppb | 0.2 ppb | 335 ppb | 0.4 ppb | 0.02 ppb | ND |
| Indole | 1.7 ppb | ND | 212 ppb | 0.1 ppb | 11.4 ppb | 0.3 ppb | 0.2 ppb | ND |
| Ethylmercaptan | 0.3 ppb | ND | 0.2 ppb | ND | 53.6 ppb | 0.2 ppb | 0.7 ppb | ND |
| Hydrogen Sulfide | 0.1 ppb | ND | 0.1 ppb | ND | 13.6 ppb | 0.2 ppb | 12 ppb | 0.1 ppb |
| Date of experiments | average of three runs, February 7, 8, and 9, 1976 | | average of three runs, February 15, 16 and 17, 1976 | | average of three runs, February 21, 22 and 23, 1976 | | average of three runs, June 1, 2 and 3, 1976 | |

EXAMPLE 5

Table III shows, for each crops, the amount of neutralized fertilizer appropriate for crops-raising and soil improvement.

The neutralized fertilizer can provide the poorly nourished soils with organic or inorganic nutrients and neutralizes the acid soils by the basic components in the fertilizer, if a suitable amount is added to the soil immediately before the plowing. The fertilizabilty of the present fertilizer is excellent since the particles are pulverized to a size smaller than 0.04 microns, which facilitates the assimilation by plants.

For instance, the raising period of citrus fruits such as oranges can be reduced from three months to two and a half months, and the sweet flavor is enhaused as well.

The results of the atomic absorption analysis of the basic rock is listed in Table IV.

The indication N.D.'s in Table II imply an undetectable amount of contents. The malodorant were collected by filter paper method [$NH_3$, $CH_3NH_2$, $N(CH_3)_3$, $C_8H_7N$ and $C_9H_9N$] and the vacuum bottle method [$H_2S$, $C_2H_5SH$], and analysed by atomic absorptiometry [$NH_3$] and gas chromatography [$CH_3NH_2$, $N(CH_3)_3$, $C_8H_7N$, $C_9H_9N$, $H_2S$ and $C_2H_5SH$].

Table 3

| SAMPLE crops placement | paddy | sweet potato | potato |
|---|---|---|---|
| nursery | 300g/10m² immediately after sowing 300g/10m² 20 days after sowing | 6kg/10m² before planting — | planted after the section of the seed potato has been covered with powdered rock — |
| regular bed | 500–1000 kg/1000m² immediately before plowing | 500–1000kg/1000m² immediately before plowing | 500–1000kg/1000m² immediately before plowing |
| sample crops | CUCUMBER | | |

Table 3-continued

| placement | and tomato | onion | lettuce |
|---|---|---|---|
| nursery | 300g/10m² immediately after sowing | 300g/10m² immediately after sowing | 300g/10m² immediately after sowing |
|  | 300g/10m² 20 days after sowing | 300g/10m² 20 days after sowing | — |
| regular bed | 500-1000kg/1000m² immediately before plowing | 300-500kg/1000m² immediately after sowing | 300-500kg/1000m² immediately after plowing |
| sample crops placement | egg plant and green pepper | cabbage and chinese cabbage | water melon |
| nursery | 300g/10m² immediately after sowing | 300g/10m² immediately after sowing | 300g/10m² immediately after sowing |
|  | 300g/10m² 20 days after sowing | 300g/10m² at trans plantation bed | 300g/10m² 20 days after sowing |
| regular bed | 500-1000gkg/1000m² immediately before plowing | 500-1000kg/1000m² immediately before plowing | 1000-1500kg/1000m² immediately before plowing |

Table 3 (2)

| sample crops placement | melon | straw- berry | tabacco | lotus root |
|---|---|---|---|---|
| nursery | 300g/10m² immediately after sowing | 450g/10m² immediately after sowing | 300g/10m² immediately after sowing |  |
|  | 300g/10m² 20 days after sowing | 300g/10m² 20 days after sowing | 300g/10m² 20 days after sowing |  |
| regular bed | 500-1000kg/1000m² immediately before plowing | 500-1000-1500kg/1000m² before plowing | 300-500kg/1000m² immediately before plowing | 500-1000kg/100 before plowing |
| sample crops placement | Japanese radish turnip, carrot and burdock | beans | spinack | orange |
| nursery | — | — | — | — |
| REGULAR bed | directly sown on the regular bed; 300-500kg/1000m² immediately before plowing | directly sown on the regular bed; 300-500kg/100m² immediately before plowing | directly sown on the regular bed; 500kg/1000m² before plowing | 1000kg/1000m immediately before plowing and 20kg/1000m² each at geminal flowering and ripening stages |
| sample crops placement | apple Japanese persimon peach and pear | flowering plants |  |  |
| nursery | — | — |  |  |
| regular bed | 500kg/1000m² immediately before plowing and 20kg/1000m² each at geminal flowering and ripening stages | 500kg/1000m² before plowing, and twice additional fertilization of 50kg/1000m² each |  |  |

Table 4

|  | Ca | K | Cl | P | Al | Mg | Na | Fe | Mn | Ti |
|---|---|---|---|---|---|---|---|---|---|---|
| ppm | 9 | 2.5 | 0.3 | 1.5 | 21.0 | 2.5 | 2.0 | 7.5 | 0.5 | 2.0 |

What is claimed is:

1. A process for manufacturing deodorized fertilizer comprising the following steps:
   (a) Suspending in a volume of water a quantity of basic rock selected from the group consisting of diabase, diorite, gabbro, peridotite, basalt or shalstein, said basic rock being powdered to a size smaller than 0.04 microns to promote the hydrolysis of the water soluble metallic salts eluted from the rock in order to produce a suspension in which a large amount of basic components are dissolved;
   (b) Suspending in water organic excrement materials in a volume of from three to ten times that of said powdered basic rock suspension to promote the hydrolysis of acid malodorants in order to produce a suspension in which a large amount of free acids is dissolved;

(c) Mixing said two suspensions to promote neutralization reactions between said basic components and the free acid of malodorants, whereby the malodorants are decomposed; and (d) then drying the resultant mixture of the said two suspensions to form a deodorized fertilizer.

2. A process according to claim 1, wherein the powdered basic rock is ground to below about 200-mesh and suspended in from about 20 to 100 volume percent of water and agitated to provide a suspension of particles down to about 0.04 microns; while the organic excrement materials are suspended in water in an amount from about four to five times the volume employed for said powdered basic rock said organic material being suspended into from about 20 to 100 volume percent of water and agitated under agitation to provide a suspension having particles down to about 0.04 microns.

* * * * *